UNITED STATES PATENT OFFICE.

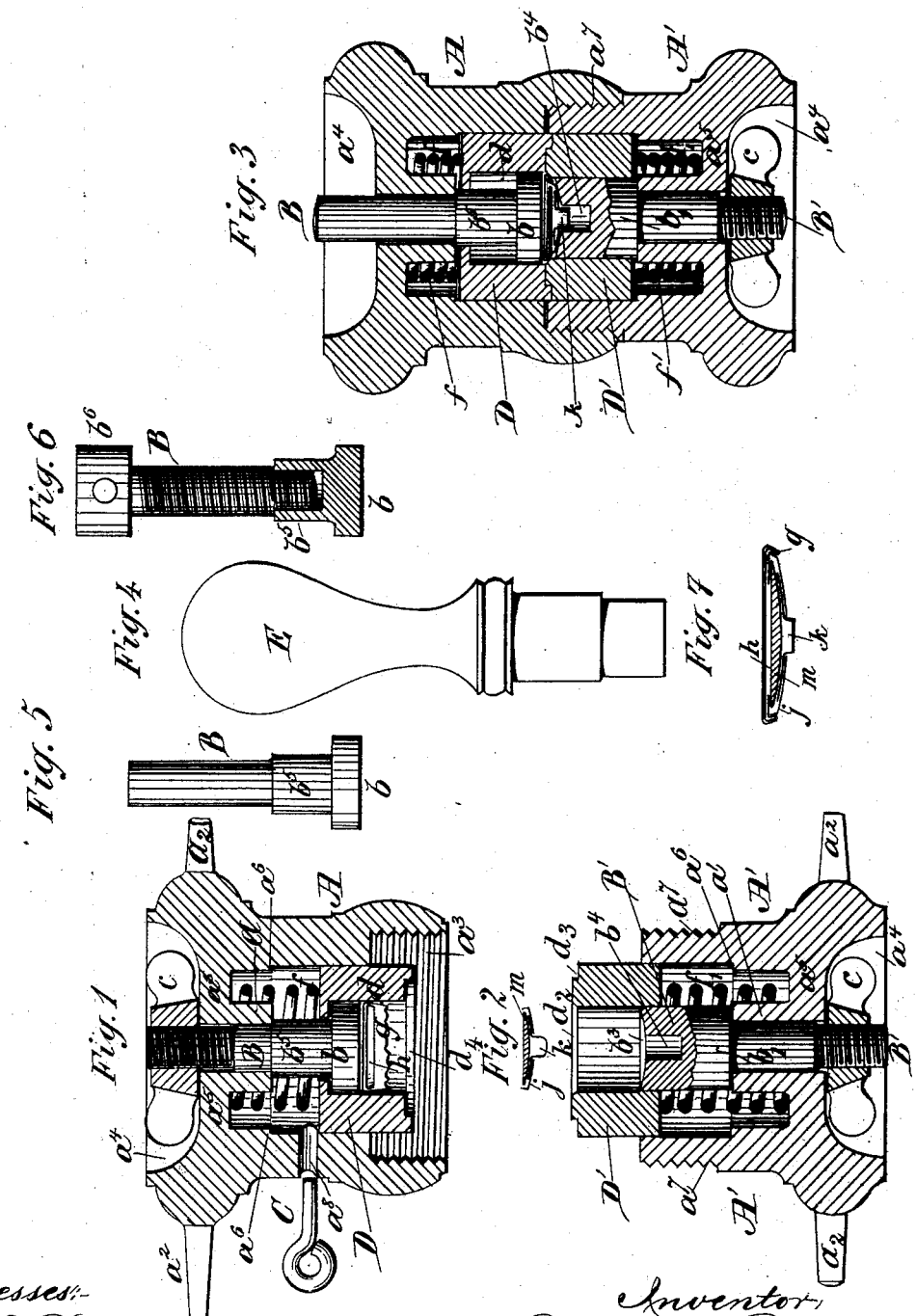

ARNOLD BRAND, OF FÜNFHAUS, NEAR VIENNA, AUSTRIA-HUNGARY.

MACHINE FOR MAKING COVERED BUTTONS.

SPECIFICATION forming part of Letters Patent No. 375,726, dated January 3, 1888.

Application filed September 27, 1887. Serial No. 250,849. (No model.) Patented in Belgium September 13, 1887, No. 78,873, and in England September 13, 1887, No. 12,428.

*To all whom it may concern:*

Be it known that I, ARNOLD BRAND, manufacturer, a subject of the Emperor of Austria-Hungary, residing at Fünfhaus, near Vienna, in the Province of Lower Austria, in the Empire of Austria-Hungary, have invented certain new and useful Improvements in Implements for Making Covered Buttons, (for which Letters Patent have been granted in Belgium, No. 78,873, dated September 13, 1887, and in England, No. 12,428, dated September 13, 1887;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figures 1 and 2 are vertical axial sections, partly in elevation, of the two die-carriers, detached, that constitute my improved device for making buttons. Fig. 3 is a like view of the two carriers, united, showing the form of anvil used when the uniting of the several parts of the button is effected by a blow on the anvil. Fig. 4 is an elevation of a tool used in conjunction with the die-carriers. Figs. 5 and 6 illustrate auxiliary anvils for one of the die-carriers by an elevation and a sectional elevation, respectively; and Fig. 7 is a transverse section of one form of button adapted to be made by the apparatus.

The invention relates to a tool for uniting the several constituent parts of a cloth button, and has for its object to provide in a compact form means for uniting the said parts.

The invention consists in structural features and in combinations of parts, substantially as hereinafter described, and as set forth in the claims.

The tool or apparatus for making cloth buttons is composed of two die-carriers, A and A', each provided with a recess, $a^4$, in its outer end, and with an axial bore of varying diameter. The axial bore of the carriers A and A' is of least diameter at its inner end, and this contracted portion is formed around an axial boss, $a$ and $a'$, respectively, that projects from the partition or end wall, $a^5$, that separates the said axial bore from the recess $a^4$. On a line with the outer face of the boss the axial bore is slightly enlarged, forming an annular shoulder, $a^6$, that, together with said outer face of the boss, form a seat for the dies. The outer end, $a^3$, of the axial bore of the die-carrier A is of still greater diameter, and is screw-threaded interiorly, and adapted to be screwed on the exteriorly-screw-threaded end $a^7$ of the die A'. Each carrier has an enlarged head, from which project radial arms $a^2$, by means of which the screwing together of the two carriers is facilitated. The bosses $a$ and $a'$ of the carriers serve also as a bearing for an anvil, B and B', respectively, the rods or stems of which are screw-threaded for the reception of a wingnut, $c$, that is seated in the recess $a^4$ of the said carriers, and by means of which nut the said anvils are rigidly connected with their respective carriers. To this end the anvil B has an enlarged portion, $b^5$, that forms an annular shoulder which abuts against the outer face of the boss $a$, while the head $b'$ of anvil B' forms a like shoulder that abuts against the face of its bearing-boss $a'$. The anvil B carries a die, D, the axial bore $d$ of which is enlarged at its outer end to form an annular seat, $d^4$, and said die is held against the head $b$ of the anvil by means of a coiled spring, $f$, one end of which abuts against the back of the die D, and the other against the end wall, $a^5$, of the carrier A.

The anvil B' carries a die, D', the outer face of which has an annular projection, $d^3$, that fits into the annular recess or seat $d^4$ of die D, and the outer end of the bore of said die D' is made to flare outwardly. The enlarged or flaring mouth of the die D' is of the same diameter as the bore of die D, while the bore of die D' is of less diameter than that of the die D. The anvil B' has a concave recess, $b^3$, in its outer face that merges into an axial recess, $b^4$, for the reception of a concavo-convex back plate, the filling, and the button-shank. The die D' is seated on a coiled spring, $f'$, of greater power than the coiled spring $f$ of die D, for a purpose presently explained.

Any suitable construction of cloth button may be made by the devices described. The button shown in the drawings is composed of a disk of fabric, g, a disk of metal, h, that has its edges turned up, and which disk constitutes the button-head, a filling, m, and a concavo-convex back plate or disk, j, whose edge is also turned up.

The operation of my improved button-making device or tool is as follows: The die-carriers being unscrewed, a disk of cloth, g, and a button-head are pressed into the die D, so as to lie on the head b of anvil B by means of the tool E, Fig. 4. In forcing these parts into the die the edges of the cloth disk will be folded over the turned-up edge of the metal disk h, as shown in Fig. 1. A back-plate, j, with the filling m, is forced into the die D', so as to lie in the concave recess $b^3$ of the anvil B' of carrier A', with the cloth shank in recess $b^4$ of said plunger. The two die carriers or sections A A' are now screwed together, and as the spring f in carrier A is weaker than the spring f' in carrier A' it will yield, the die D moving inward on the anvil B, thus bringing the cloth covering and button-head into the enlarged or flaring end of the die D'. As the edge of the covering enters into the said flaring portion, it will be folded entirely over the upturned edge of the button-head h by the inwardly-contracting wall of the mouth of the bore of die D'. When this takes place, the die D will have reached the limit of its inward motion and will abut against the boss a of carrier A. By screwing the carriers farther together the spring f' will yield to the pressure, and the die E' will move inwardly on the anvil B', thereby bringing the filling m k and back-plate j in contact with the button-head and cover, and in such a manner that the upturned edge of the said back-plate will lie inside of the like edge of the button-head with the edge of the button-cover folded over the edge of the button-head and under the edge of the back-plate, as shown in Fig. 7. By screwing the carriers still farther together the edge of the button-head will be upset over the edge of the back-plate, thereby securing the parts firmly together and completing the button.

When buttons are to be covered with a fabric of greater than usual thickness, the spring f of carrier A may yield when the fabric and button-head are forced into the die D by means of the tool E, and thereby defeat the proper operation of the devices. To avoid this I, employ a locking-pin, C, that can be pushed through a hole, $a^8$, in carrier A, so as to project in rear of the die and prevent its inward movement. On the other hand, when it is desired to make buttons of heavy materials, a greater power may be required than that obtained by simply screwing the carriers together by hand. In this case I employ either of the anvils shown in Figs. 5 and 6, in conjunction with the carrier A. The shank of the anvil B (shown in Fig. 5) passes loosely through the boss a of the carrier A, so that when the two carriers are screwed together, and the parts of the button are in position for upsetting the edge of the button-disk over the fabric and edge of the back-plate, as shown in Fig. 3, the upsetting may be effected by a blow or blows on the shank of the anvil. The upsetting may also be effected by the anvil shown in Fig. 6, the screw-threaded shank of which works in the boss a of carrier A, which boss, for this purpose, is screw-threaded interiorly. In this case the shank of the anvil has a head, $b^6$, provided with a transverse opening for the reception of a rod, by means of which the anvil is screwed in and out, and said head may be made angular for the application of a key or wrench.

In order to adapt the carrier A for use with either form of plunger, the bore of the boss a may be screw-threaded, as will be readily understood.

Having described my invention, what I claim is—

1. In the cloth-button-making tool herein described, the combination of two die-carriers adapted to be screwed together, an anvil for and arranged axially in each carrier, and a die for the reception of the button-sections, mounted and movable endwise on the respective anvils, whereby the pressure required to unite the parts of the button may be obtained by screwing the carriers together, substantially as and for the purpose specified.

2. In the cloth-button-making tool herein described, the combination of two die-carriers adapted to be screwed together, an anvil for each carrier arranged axially therein, a die for the reception of the button-sections, mounted and movable endwise on the respective anvils, and an elastic bearing for said dies, substantially as and for the purpose specified.

3. In the cloth-button-making tool herein described, the combination of two die-carriers adapted to be screwed together, an anvil for each carrier arranged axially therein, a die for the reception of the button-sections, mounted and movable endwise on the respective anvils, and an elastic bearing for each of the dies, said bearings differing in the degree of their elasticity, substantially as and for the purpose specified.

4. In the cloth-button-making tool herein described, the combination of two die-carriers adapted to be screwed together, an anvil for and arranged axially in each carrier, and a die for the reception of the button-sections, mounted and movable endwise on the respective anvils, said anvil being detachably connected with its carrier, whereby different anvils may be interchangeably connected with the carriers, as described, for the purpose specified.

5. In the cloth-button-making tool herein described, the combination of two die-carriers adapted to be screwed together, an anvil for and arranged axially in each carrier, and a die for the reception of the button-sections, mounted and movable endwise on the respective anvils, said anvils and dies being detachably connected with each other and with the carriers, as described, for the purpose specified.

6. In the cloth-button-making tool herein described, the combination of two die-carriers adapted to be screwed together, an anvil for each carrier arranged axially therein, a die for the reception of the button-sections, mounted and movable endwise on the respective anvils, an elastic bearing for each of the dies, and a locking device for locking one of the dies against endwise motion on its anvil, substantially as and for the purpose specified.

In testimony whereof I affix my signature in presence of two witnesses.

ARNOLD BRAND.

Witnesses:
EDMUND JUSSEN,
OTTO SCHIFFER.